(12) United States Patent
Nagel et al.

(10) Patent No.: US 8,793,213 B2
(45) Date of Patent: Jul. 29, 2014

(54) EMBEDDED DATA MARTS FOR CENTRAL DATA WAREHOUSE

(75) Inventors: Klaus Nagel, Heidelberg (DE); Rainer Schaefer, Rauenberg (DE); Silvia Bratz, Walldorf (DE); Marcus Hoepfner, Walldorf (DE); Patrick Winkler, Heidelberg (DE); Matthias Jensen, Walldorf (DE); Dirk Janning, Walldorf (DE)

(73) Assignee: SAP AG, Walldorf (DE)

( * ) Notice: Subject to any disclaimer, the term of this patent is extended or adjusted under 35 U.S.C. 154(b) by 94 days.

(21) Appl. No.: 13/478,669

(22) Filed: May 23, 2012

(65) Prior Publication Data

US 2013/0318030 A1 Nov. 28, 2013

(51) Int. Cl.
*G06F 17/00* (2006.01)
*G06F 17/30* (2006.01)
(52) U.S. Cl.
CPC ............................... *G06F 17/30563* (2013.01)
USPC ............ 707/602; 707/781; 707/785; 707/787
(58) Field of Classification Search
CPC .................... G06F 17/30563; G06F 17/30592; G06F 21/62
USPC ............. 707/600, 781, 785, 787, 602; 705/28
See application file for complete search history.

(56) References Cited

U.S. PATENT DOCUMENTS

| | | | | |
|---|---|---|---|---|
| 5,634,057 | A * | 5/1997 | Dickinson | 719/315 |
| 6,802,041 | B1 * | 10/2004 | Rehm | 715/201 |
| 8,161,120 | B2 * | 4/2012 | Tan | 709/206 |
| 2006/0075509 | A1 * | 4/2006 | Kishon | 726/34 |
| 2008/0068962 | A1 * | 3/2008 | Hirabayashi et al. | 369/83 |
| 2008/0263064 | A1 * | 10/2008 | Choi | 707/100 |
| 2009/0013043 | A1 * | 1/2009 | Tan | 709/205 |
| 2009/0070291 | A1 * | 3/2009 | Tadayon et al. | 707/2 |
| 2009/0138492 | A1 * | 5/2009 | Park et al. | 707/100 |
| 2009/0144302 | A1 * | 6/2009 | Baldwin | 707/100 |
| 2009/0319544 | A1 * | 12/2009 | Griffin et al. | 707/100 |
| 2013/0013560 | A1 * | 1/2013 | Goldberg et al. | 707/634 |
| 2013/0191306 | A1 * | 7/2013 | Wilkinson et al. | 705/348 |

* cited by examiner

*Primary Examiner* — Phong Nguyen
(74) *Attorney, Agent, or Firm* — Fountainhead Law Group PC (57) ABSTRACT

A central data warehouse includes embedded data marts. These embedded data marts, referred to as workspaces, are assigned centrally manage data by reference only but rely directly on the centrally managed data and the underlying infrastructure. Workspaces still allow departments in an enterprise to perform certain actions on their own (like adding new data and building new models) without having to instantiate copies of the centrally managed data in a locally managed data mart.

20 Claims, 4 Drawing Sheets

EMBEDDED DATA MARTS FOR CENTRAL DATA WAREHOUSE

BACKGROUND

Unless otherwise indicated herein, the approaches described in this section are not prior art to the claims in this application and are not admitted to be prior art by inclusion in this section.

A central data warehouse (CDW) generally serves as a central repository for informational data about a business enterprise. Typically, the source data for the central data warehouse come from various operational applications executing in the business enterprise such as enterprise resource planning (ERP) systems, customer relations management (CRM) systems, human resource (HR) systems, and so on. The central data warehouse is sometimes referred to by other terms such as "data warehouse", "centralized" data warehouse, enterprise data warehouse, and so on.

An enterprise typically builds a central data warehouse to enable a consolidated view on the relevant key performance indicators (KPIs) such as sales volume, margin, profit, etc. Setting up such a central data warehouse requires company-wide efforts and means a significant investment for the company. Despite the complexity and cost, a central data warehouse nonetheless provides valuable information to the business enterprise by providing a total view of the company's performance and financial status using data collected from various sources within the enterprise. A central data warehouse is typically maintained and controlled by an information technology (IT) department which relies on clearly formulated requirements by the business.

The central data warehouse is suitable from the point of view of the enterprise as a whole. However, groups within the enterprise require flexibility in terms of being able to view the data in their own way, develop new data models, and conduct analyses in ways that are specific to their needs. The central data warehouse architecture is generally not so dynamic. Because of the centralized nature of the data, there are typically strictly controlled and limited accesses to the central data warehouse. Accordingly, the response time to the demands of new or changing requirements by the individual users or business departments is likely to be long. In addition, the sheer volume of data that may have to be processed can add to the delay. Also, due to an increasing number of legal constraints, such as auditing rules, data protection rules, world-wide financial regulations requiring centralized governance of the data, and so on, the resulting procedural delays ("red tape") can further increase the response times.

A conventional solution is the use of local data marts. The term "data mart" is generally understood as comprising a partition of the total enterprise data that is stored and maintained in the central data warehouse. The data mart typically is created for a specific use by a group of users in the enterprise. For example, a sales group may only be interested in regional sales figures for their own planning purposes, and would not be interested in data relating to manufacturing. Accordingly, a data mart of regional sales figures may be instantiated for the sales group. Conventionally, the sales group might download a copy of just the regional sales data from the central data warehouse to create a local instance of the regional sales data in their data mart. Then they use this data to build a smaller solution that can be controlled and maintained only by them.

Having a local copy of the data in their own local data mart gives a business department within the enterprise the freedom to fulfill their requirements in the manner that they want, without the constraints imposed by the central data warehouse. This conventional approach, however, has several drawbacks:

Redundancy: It creates additional data redundancies in the organization as the data is replicated to the local instances.

Security: The person who downloaded the data may see more or different data than other users of the local solution. These restrictions have to be re-implemented on the local instance or, as it is often the case, are simply neglected.

The "one version of truth" approach is violated. The downloads represent snapshots of the data at any time, reporting on different such local solutions can differ significantly and cause bad decisions and/or endless discussions on which dataset is the "right" one.

Higher total cost of ownerships for the company. These local solutions also require technically skilled people to manage them and the departments start to build up "shadow" IT organizations instead of relying on the central services of the IT organization.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
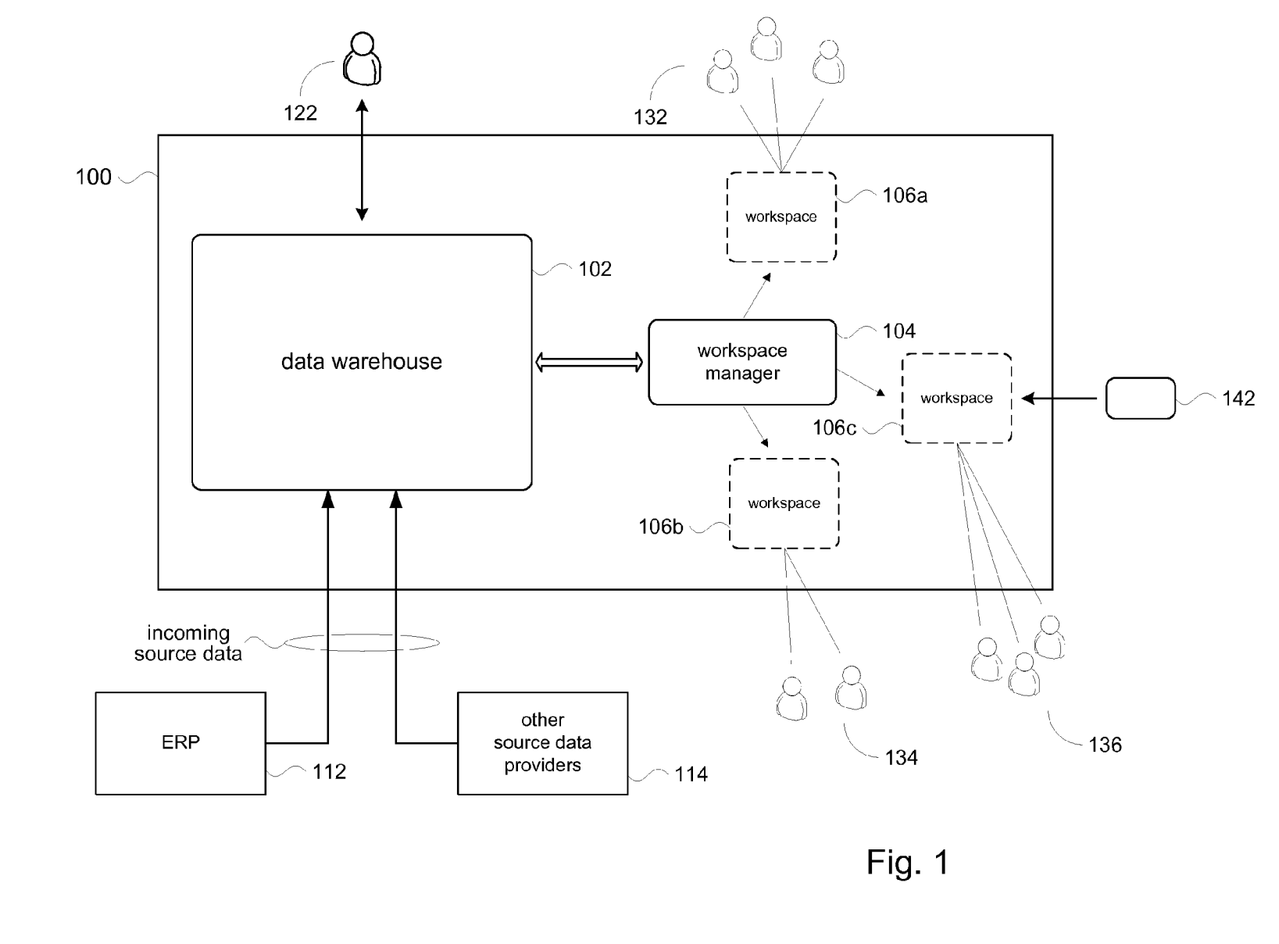
FIG. 1 shows an illustrative embodiment of a central data warehouse in accordance with the present disclosure.

FIG. 1 shows a high level overview of a central data warehouse ("data warehouse") system 100 in accordance with principles of the present invention. The central data warehouse system 100 for an enterprise may receive source data from various sources in the enterprise; for example, an enterprise resource planning system 112. Of course, it will be appreciated that the central data warehouse system 100 may receive source data from other providers of source data 114. An IT administrator 122 may manage the central data warehouse system 100, including defining and maintaining the underlying data model by which the incoming source data are modeled. The IT administrator 122 may provide and maintain several global data views (e.g., total sales figures, total costs, etc.) of the data model, for example, to allow the financial health of the enterprise to be assessed by management level users in the enterprise.

In some embodiments, the central data warehouse system 100 may comprise a data warehouse 102 and a workspace manager 104. The data warehouse 102 may include hardware and software components which support the storage, accessing, viewing, and general maintenance of the incoming source data. The data stored and managed by the data warehouse 102 is sometimes referred to collectively as "centrally managed data."

In accordance with the present disclosure, the workspace manager 104 is a component of the central data warehouse system 100 that provides and manages one or more workspaces 106a, 106b, 106c to support specific activities for various groups 132, 134, 136 of users within the enterprise; e.g., sales, production, marketing, engineering, finance, etc. Local data 142 may be imported into a group's workspace (e.g., 106c). The local data 142 may be data that is specific to the group. The local data 142 may include confidential information that the group does not wish to share with others outside the group.

Figure 2:
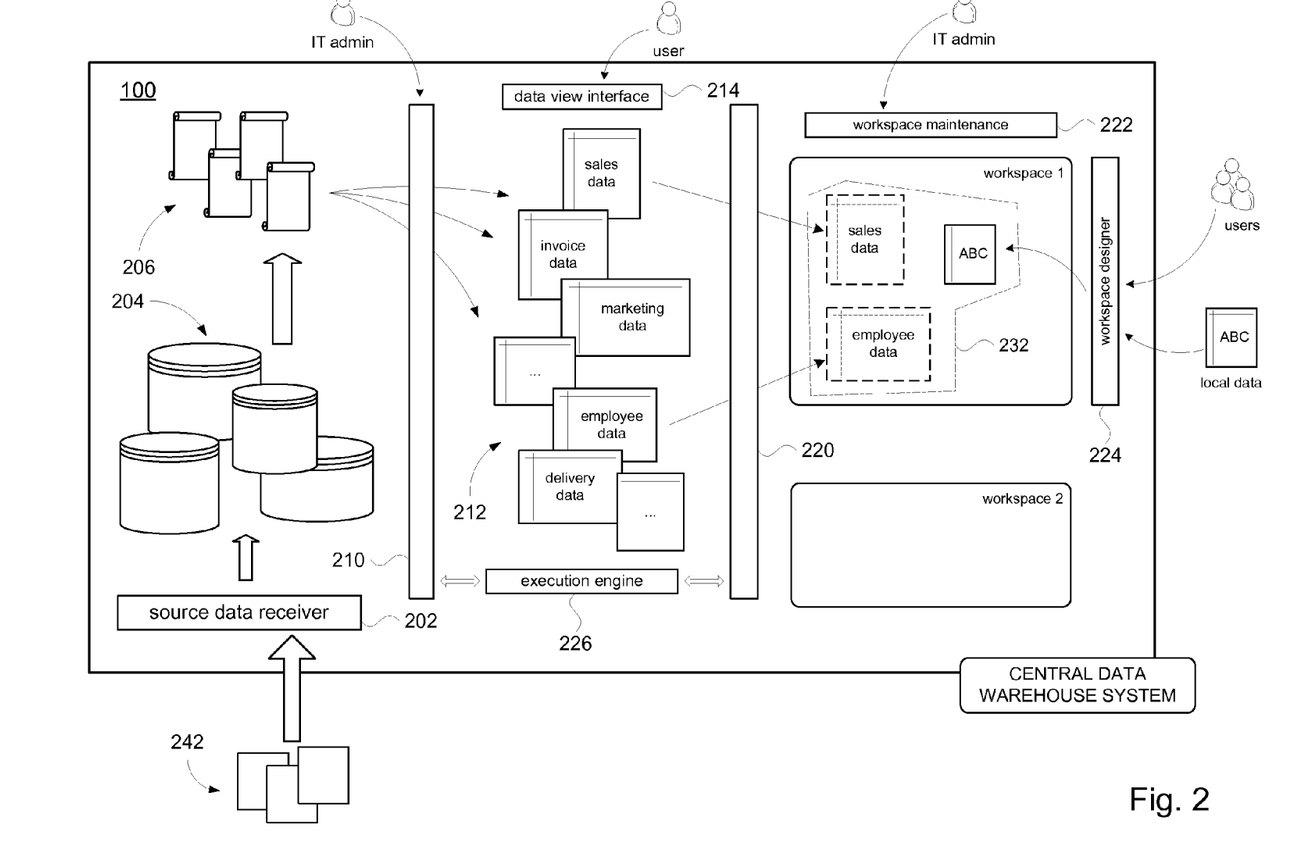
FIG. 2 shows additional details of the central data warehouse example of FIG. 1.

Referring to FIG. 2, the central data warehouse system 100 in accordance with some embodiments of the present disclosure may include a source data receiver 202 for receiving incoming source data 242. An extraction, translation, load (ETL) tool, for example, may be a component in the source data receiver 202. The incoming source data 242 may be loaded into a suitable database system 204 (e.g., a relational database management system, RDBMS). Though not illustrated, it will be understood that the database system 204 may comprise a data storage subsystem to house or store the received incoming source data 242, and a database management subsystem to provide database services in order to access the stored source data. The database system 204 may be configured to represent a configuration of data tables which collectively define a data model 206 to model the source data in a way that is useful to the enterprise.

A data view generator 210 may be used to provide data views 212 of the data model 206 that users in the enterprise may want to see. Since the data stored in the data model 206 comprises all data relating to the enterprise, strict access controls are typically needed to ensure the integrity and security of the data. Typically, only an enterprise-level IT administrative group is permitted to access and build the data views 212 using, for example, the data view generator 210.

The IT administrator may designate access controls for each of the data views 212; for example, the data views 212 may be read-only. Data views 212 may be further restricted to certain groups within the enterprise. For instance, data views relating to employees' salaries may only be accessible by people in the human resources (HR) department, and perhaps only to certain people within the HR department. The data views 212 may be accessed by a business user via a data warehouse interface 214.

In an embodiment, the foregoing described components may be viewed collectively as constituting the data warehouse 102 shown in FIG. 1. Centrally managed data may include the data views 214, in addition to the data contained in the data tables comprising the data model 206. In other words, centrally managed data may refer to all the enterprise data that is collected (e.g., incoming source data 242), stored, and maintained by the central data warehouse system 100, including data derived (e.g., data views) from the collected and stored enterprise data.

In accordance with principles of the present disclosure, the central data warehouse system 100 supports the idea of "workspaces." FIG. 2 shows two instances of a workspace, "workspace 1" and "workspace 2." Referring to workspace 1 as simply "the workspace," the workspace allows a group of users to perform data modeling or other analytics that are specific to their needs, using portions of the centrally managed data stored in the data warehouse. Accordingly, the workspace may be assigned data views 212, portions of the data views, data from the data tables comprising the data model 206, and so on. As will be explained in more detail below, the centrally managed data that is assigned to the workspace is assigned by reference only.

A workspace services interface 220 may provide services to support the creation, usage, and general maintenance of workspaces (e.g., workspace 1, workspace 2) provided by the central data warehouse system 100. A workspace maintenance module 222 may be provided to manage workspaces within the central data warehouse system 100. In some embodiments, the workspace maintenance module 222 may allow the IT administrator to create workspaces, to assign centrally managed data to the workspaces, to assign the workspaces to users in the enterprise, to change workspaces, delete workspaces, monitor activity in the workspaces, and so on.

A workspace designer module 224 may be used to provide a suitable interface that allows business users to work in their assigned workspaces, such as creating data models, importing data, performing analytics, generating views, and so on. A user may import or upload locally produced data ("local data") into their assigned workspace. The data is "local" in that it may be unique to the group of users using the workspace; for example, the data may be for assessing what-if scenarios specific to that group. Data modeling or other analytics may be performed on the centrally managed data that is assigned to the workspace and any imported local data. For example, the workspace designer module 224 may include conventional data modeling or analytical tools to support the users' data modeling efforts.

The workspace maintenance module 222 and the workspace designer module 224 may access the services provided by the workspace services interface 220 to perform their respective tasks. In some embodiments, the workspace maintenance module 222 and the workspace designer module 224 may be deemed to constitute the workspace manager 104 shown in FIG. 1.

As noted above, data that is associated with the workspace includes centrally managed data that has been assigned to the workspace by an IT administrator and local data imported into the workspace. Data models 232 created by users of a workspace may also be deemed data that is associated with the workspace. Data associated with the workspace is "visible" only to users of the workspace. This can be achieved in some embodiments, for example, by requiring a user to login to their assigned workspace in order to initiate a workspace session; e.g., via the workspace designer module 224. Any data associated with the workspace becomes visible only to users who can login to the workspace. Similarly, a user should have visibility only to data in their workspace. For example, if user A is not assigned to workspace N, then data in workspace N should not be visible to user A. The login procedure achieves this because user A would not be allowed to login to the workspace N. It will be appreciated that in other embodiments, other mechanisms may be employed to restrict workspace access to only users assigned to the workspace, and to restrict users to only workspaces to which they are assigned.

A user assigned to a workspace generally has read and write access to the workspace. For example, the user may read data that is associated with the workspace. Any data that the user creates in the workspace may also be subsequently read and written by the user. However, in accordance with the present disclosure, centrally managed data that is assigned to the workspace is read-only. This restriction maintains the integrity of the centrally managed data while at the same time facilitating the user's data modeling needs by granting read access to the centrally managed data.

Figure 3:
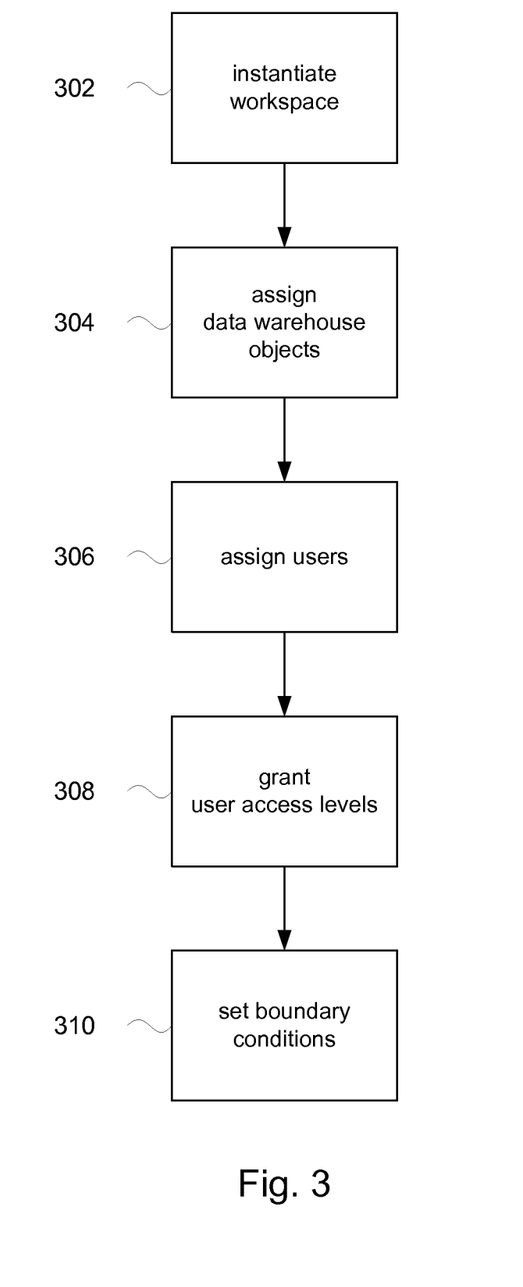
FIG. 3 illustrates a process flow in accordance with the present disclosure.

FIG. 3 shows a process flow in accordance with some embodiments for creating a workspace. A user or group of users may request that a workspace be created to support their data modeling or analytics needs. In response, the IT administrator may use the workspace maintenance module 222 to create a workspace in accordance with principles of the present disclosure. Accordingly, in a step 302, a workspace may be instantiated. This may include giving the workspace a name and creating various metadata files to manage the workspace.

In a step 304, objects form the data warehouse may be assigned to the instantiated workspace. The objects may include data from the centrally managed data such as data views 214 or data tables comprising the data model 206. In some embodiments, objects may include queries previously defined by the central data warehouse system 100, previously defined analytics, and so on, allowing for reusability of previously defined tools. This step may be repeated during the lifetime of the workspace. The IT administrator may assign additional objects to the workspace subsequent to creating the workspace, for example, to accommodate users as their date modeling needs change. Conversely, objects previously assigned to a workspace may be un-assigned as users' needs or situations change.

In accordance with the principles of the present disclosure, the assignment of centrally managed data to the instantiated workspace is by reference only. In other words, the central data warehouse system 100 does not download or otherwise store into the workspace a copy of the actual data corresponding to the assigned centrally managed data, but rather contains references to the assigned centrally managed data. An analogy might be the concept of a pointer in some computer programming languages such as the C programming language. Another analogy might be the notion of a symbolic link used in some file systems such as used in a Unix-based operating system.

An example is illustrated in FIG. 2. The "sales data" and "employee data" are data views in the centrally managed data. They are indicated as being assigned to "workspace 1." However, the workspace does not contain a local copy of the data that correspond to the "sales data." Instead, the workspace contains a reference to "sales data." Likewise, the workspace contains a reference to "employee data." As will be explained below, the workspace services interface 220 provides, during a workspace session, "transient data" that correspond to these references to the centrally managed data.

In a step 306, the IT administrator may assign users to the instantiated workspace. Users may be assigned at the time of creating the workspace. And during the lifetime of the workspace, additional users may be assigned or may be removed (un-assigned) as the situation changes.

In a step 308, the IT administrator may apply various access controls to the assigned users. Group level access controls may be applied that affect all the users in the group that are assigned to the workspace. Individual access controls may be applied on a per user basis; for example, the manager of a group may have more access than non-managers. Access controls may include typical control settings such as read and write access to the workspace. However, as mentioned above, access to centrally managed data that is assigned to the workspace is read-only. Access controls may specify when and where the workspace may be accessed. For example, access may be granted for specific windows of time. Access to a workspace may be restricted to computers (e.g., clients) that are connected to the enterprise's internal communication network. And so on. It will be appreciated that other controls may be enforced.

In a step 310, the IT administrator may set boundary conditions on the instantiated workspace. For example, the IT administrator may limit the amount of data (e.g., local data) that can be uploaded and stored in the workspace. This data limit may be expressed in terms of total data (e.g., 1 Gigabyte of data), or the data limit may be expressed as the maximum number of files, and so on. The workspace may have a "lifetime"; for example, users may be allowed to use a workspace for 3 months. After the lifetime of the workspace has expired, the workspace may then be de-activated so that users can no longer access the workspace, or the workspace may be deleted including deleting any stored data. The workspace may be de-activated if no one has used the workspace for a period of time. The IT administrator may impose certain naming conventions on the data that the user might create in the workspace. The IT administrator may limit the computational resources allocated to the workspace. It will be appreciated that other boundary conditions may be imposed on the workspace, for example, in order to avoid any one workspace from consuming too much processing and storage resources of the central data warehouse system 100.

After creating the workspace, users may then access the workspace and conduct modeling or other analytical activities on the data in the workspace. Following are typical activities that a user may perform:

access the workspace—In some embodiments, a user may access their assigned workspace, for example, by performing a login sequence using the workspace designer module 224. It will be appreciated that in other embodiments, other mechanisms may be provided to allow the user to gain access to their assigned workspace.

perform analyses—The workspace designer module 224 may provide tools that allow the user to develop data models on their data, or to perform other analytics on their data. The data may include centrally managed data that is assigned to the workspace and data that the user may import.

upload data—As noted above, the workspace designer module 224 may provide tools that allow the user to import data that they may have created for their modeling purposes.

generate data views—The workspace designer module 224 may provide the user with tools to perform queries on the their data models and to generate data views of their data models. The user may perform data table operations such as JOINs and UNIONs.

exit the workspace—In some embodiments, the user may exit their workspace, for example, by logging out of the system.

As explained above, in accordance with principles of the present disclosure, centrally managed data that is assigned to a workspace is assigned by reference only, and thus may be referred to as "referenced data." For example, in FIG. 2, the "sales data" and "employee data" represented in the data model 232 of workspace 1 are examples of referenced data. Since the workspace does not have an actual copy of the data that correspond to the referenced data, the workspace services interface 220 may provide utilities for the workspace designer module 224 to perform operations that use referenced data. Operations may include creating data models that use referenced data, performing data table operations on referenced data, generating data views, and so on.

In accordance with the present disclosure, the workspace services interface 220 may generate "transient data" that correspond to the referenced data. Utilities provided by the workspace services interface 220 may include low level functions that operate on the transient data to perform the operations (e.g., table JOINs) called for by the workspace. Transient data is data that is created during the user's workspace session. At the end of the workspace session (e.g., when the user exits the workspace), the transient data may be deleted. In some embodiments, therefore, though the workspace does not posses a copy of the data corresponding to the reference data, operations on the data may nonetheless be performed on the transient data provided by the workspace services interface 220 during the workspace session so that the user can still do their data modeling or other analytics on the centrally managed data that is assigned to their workspace.

In accordance with the present disclosure, data imported into the workspace by a user may be used in any operations that are performed on the referenced data. For example, a JOIN operation may be performed between a locally uploaded data table and a data table in the centrally managed data that corresponds to a referenced data table.

An advantageous outcome of a workspace having only referenced data to the centrally managed data and performing operations on transient data is that no persistent copies of the centrally managed data are created outside of the central data warehouse system 100. Accordingly, the control of the central data warehouse system 100 can maintain and ensure the security of the centrally managed data. As a corollary, the workspace obviates the need for duplicating data security measures by groups who need to access centrally managed data since there are no persistent copies of the centrally managed data stored in the groups' workspaces. In some embodiments, the security measures associated with the centrally managed data are inherited by the workspace. Since the centrally managed data is not copied into an instance in the workspace, and access to the centrally managed data is done via the same infrastructure (e.g., the workspace services interface 220 may incorporated the security infrastructure of the central data warehouse system 100), the security settings of the centrally managed data are automatically inherited by the workspace.

Another advantage of a workspace using referenced data is that the workspace is guaranteed to be operating on the most current state of the data because the transient data is generated on the fly each time the referenced data is used. In addition, different workspaces that use the same referenced data will be guaranteed to be accessing the same state of the corresponding data. Results from different groups using different workspaces can be assured that their respective models or analyses are based on the same underlying data.

Figure 4:
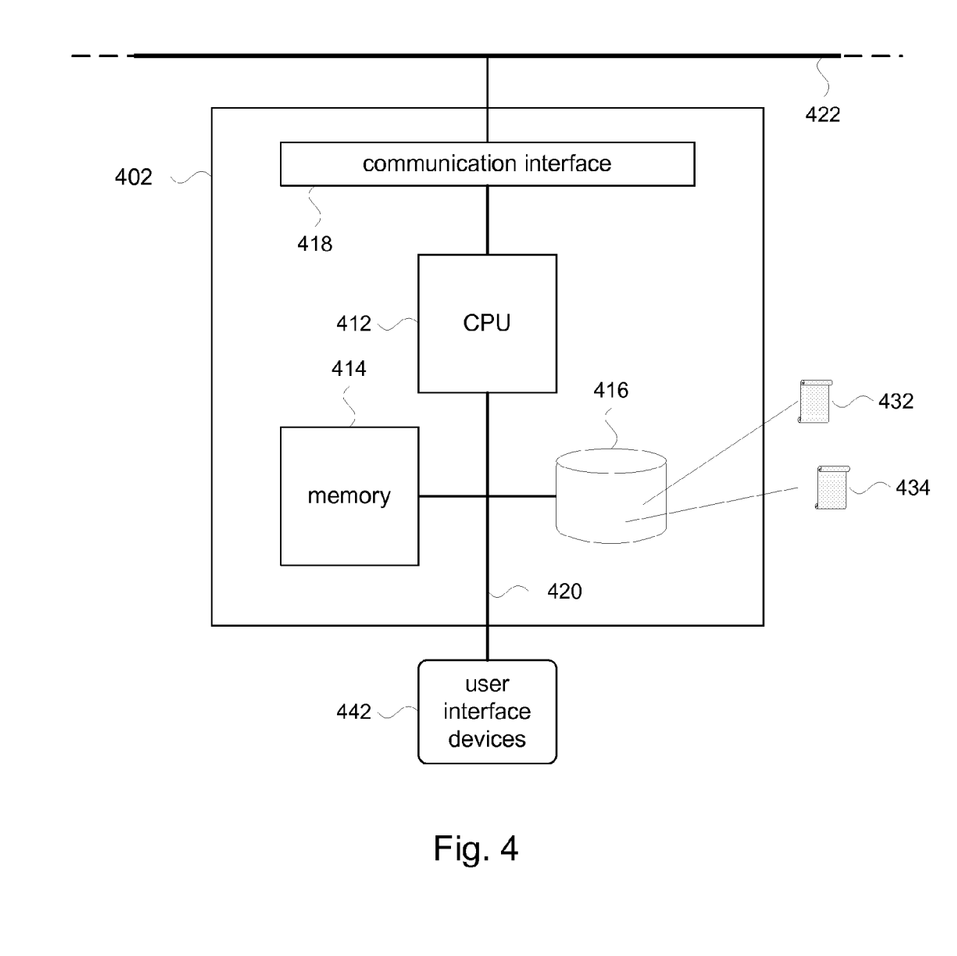
FIG. 4 illustrates a high level system block diagram of a typical implementation in accordance with the present disclosure.

A particular embodiment of the central data warehouse system 100 in accordance with the present disclosure is illustrated in FIG. 4, showing a high level block diagram of a computer system 402 configured to operate in accordance with the present disclosure. The computer system 402 may include a central processing unit (CPU) or other similar data processing component. The computer system 402 may include various memory components. For example, the memory components may include a volatile memory 414 (e.g., random access memory, RAM) and a data storage device 416. A communication interface 418 may be provided to allow the computer system 402 to communicate over a communication network 422, such as a local area network (LAN), the Internet, and so on. An internal bus 420 may interconnect the components comprising the computer system 402.

The data storage device 416 may comprise a non-transitory computer readable medium having stored thereon computer executable program code 432. The computer executable program code 432 may be executed by the CPU 412 to cause the CPU to perform steps of the present disclosure, for example the steps set forth in FIG. 3. The data storage device 416 may store data structures 434 such as object instance data, runtime objects, and any other data described herein.

A user (e.g., IT administrator, business user) may interact with the computer system 402 using suitable user interface devices 442. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a computer system comprising a processor and a memory, the computer system hosting a data warehouse, the method comprising operating the computer system to perform steps of:

receiving source data from a plurality of data sources in an enterprise;

storing the source data, as centrally managed data, in a data storage system configured with a plurality of data tables that comprise the data warehouse, including:

using an extraction, translation, and load (ETL) tool to process the source data and storing the processed source data in the data warehouse;

using the processed source data to generate a plurality of enterprise data models and storing the enterprise data models in the data warehouse; and using the enterprise data models stored in the data warehouse to generate a plurality of enterprise data views and storing the enterprise data views in the data warehouse;

creating a workspace, including:

assigning at least one of the enterprise data models and enterprise data views stored in the data warehouse as referenced data to the workspace by reference only; and assigning a plurality of first users to the workspace;

granting only the first users read and write access to the workspace, the first users having read-only access to data that correspond to the referenced data;

accepting only from the first users local data that is external to the computer system; and defining a user data model in the workspace using the referenced data and the local data.

2. The method of claim 1 wherein the workspace does not include any persistent copies of the data that correspond to the referenced data.

3. The method of claim 1 further comprising performing query processing operations on the user data model including accessing the centrally managed data stored in the data storage system that correspond to the referenced data and operating on the accessed centrally managed data and the local data in accordance with the query processing operations.

4. The method of claim 3 wherein performing query processing operations further includes adhering to access controls that are associated with the accessed centrally managed data.

5. The method of claim 3 further including displaying results of operating on the accessed centrally managed data and the local data in the workspace, wherein the results are not persisted in the workspace.

6. The method of claim 1 wherein the read-only access is further limited in accordance with access controls that are associated with the data that correspond to the referenced data.

7. The method of claim 1 further comprising designating a maximum amount of data that can be associated with the workspace.

8. The method of claim 1 further comprising designating a maximum number of files that can be associated with the workspace.

9. The method of claim 1 further comprising designating a lifetime of the workspace, and when a period of time greater than the lifetime of the workspace has elapsed, then denying access to the workspace.

10. The method of claim 9 further comprising deleting the workspace when the period of time has elapsed.

11. A computer system that hosts a central data warehouse, the computer system comprising:
a data processing system comprising a processor and a memory; and
a data storage system,
the data processing system using the data storage system to host a central data warehouse, the data processing system including computer executable program code which when executed by the processor, causes the processor to:
receive source data from a plurality of data sources in an enterprise;
store the source data, as centrally managed data, in the data storage system configured with a plurality of data tables that comprise the central data warehouse, including:
using an extraction, translation, and load (ETL) tool to process the source data and storing the processed source data in the data warehouse;
using the processed source data to generate a plurality of enterprise data models and storing the enterprise data models in the data warehouse; and
using the enterprise data models stored in the data warehouse to generate a plurality of enterprise data views and storing the enterprise data views in the data warehouse;
create a workspace, including:
assigning at least one of the enterprise data models and enterprise data views stored in the data warehouse as referenced data to the workspace by reference only; and
assigning a plurality of first users to the workspace;
grant only the first users read and write access to the workspace, the first users having read-only access to data that correspond to the referenced data;
accept only from the first users local data that is external to the computer system; and
define a user data model in the workspace using the referenced data and the local data.

12. The computer system of claim 11 wherein the workspace does not include any persistent copies of the data that correspond to the referenced data.

13. The computer system of claim 11 wherein the computer executable program code further causes the processor to perform query processing operations on the data model including accessing the centrally managed data stored in the data storage system that correspond to the referenced data and operating on the accessed centrally managed data and the local data in accordance with the query processing operations.

14. The computer system of claim 13 wherein performing query processing operations further includes adhering to access controls that are associated with the accessed centrally managed data.

15. The computer system of claim 13 further including displaying results of operating on the accessed centrally managed data and the local data in the workspace, wherein the results are not persisted in the workspace.

16. The computer system of claim 11 wherein the read-only access is further limited in accordance with access controls that are associated with the data that correspond to the referenced data.

17. A non-transitory computer readable storage medium having stored thereon computer executable program code, which when executed by a computer system, causes the computer system to perform a method for hosting a data warehouse comprising:
receiving source data from a plurality of data sources in an enterprise;
storing the source data, as centrally managed data, in a data storage system configured with a plurality of data tables that comprise the data warehouse, including:
using an extraction, translation, and load (ETL) tool to process the source data and storing the processed source data in the data warehouse;
using the processed source data to generate a plurality of enterprise data model and storing the enterprise data models in the data warehouse s; and
using the enterprise data models stored in the data warehouse to generate a plurality of enterprise data views and storing the enterprise data views in the data warehouse;
creating a workspace, including:
assigning at least one of the enterprise data models and enterprise data views stored in the data warehouse as referenced data to the workspace by reference only; and
assigning a plurality of first users to the workspace;
granting only the first users read and write access to the workspace, the first users having read-only access to data that correspond to the referenced data;
accepting only from the first users local data that is external to the computer system; and
defining a user data model in the workspace using the referenced data and the local data.

18. The non-transitory computer readable storage medium of claim 17 wherein the workspace does not include any persistent copies of the data that correspond to the referenced data.

19. The non-transitory computer readable storage medium of claim 17 wherein the computer system further performs a step of performing query processing operations on the data model including accessing the centrally managed data stored in the data storage system that correspond to the referenced data and operating on the accessed centrally managed data and the local data in accordance with the query processing operations.

20. The non-transitory computer readable storage medium of claim 17 wherein the read-only access is further limited in accordance with access controls that are associated with the data that correspond to the referenced data.

\* \* \* \* \*